United States Patent
Peacock et al.

(10) Patent No.: US 11,308,201 B2
(45) Date of Patent: Apr. 19, 2022

(54) MDM-BASED PERSISTENT SECURITY MONITORING

(71) Applicant: Sennco Solutions, Inc., Plainfield, IL (US)

(72) Inventors: Brian Peacock, Melbourne, FL (US); Dale R. Liff, Montgomery, IL (US); Stephen M. Strom, North Olmsted, OH (US); George Liff, Streetsboro, OH (US)

(73) Assignee: SENNCO SOLUTIONS, INC., Plainfield, IL (US)

( * ) Notice: Subject to any disclaimer, the term of this patent is extended or adjusted under 35 U.S.C. 154(b) by 84 days.

(21) Appl. No.: 16/782,695

(22) Filed: Feb. 5, 2020

(65) Prior Publication Data
US 2020/0250299 A1    Aug. 6, 2020

Related U.S. Application Data

(60) Provisional application No. 62/801,623, filed on Feb. 5, 2019.

(51) Int. Cl.
| | | |
|---|---|---|
| *G06F 21/00* | (2013.01) | |
| *G06F 21/51* | (2013.01) | |
| *G06F 21/88* | (2013.01) | |
| *G06F 21/55* | (2013.01) | |
| *H04W 12/37* | (2021.01) | |

(52) U.S. Cl.
CPC ........... *G06F 21/51* (2013.01); *G06F 21/554* (2013.01); *G06F 21/88* (2013.01); *H04W 12/37* (2021.01); *G06F 2221/2151* (2013.01)

(58) Field of Classification Search
CPC ............. G06F 2221/2151; G06F 21/88; G06F 21/554; G06F 21/51; H04W 12/37
USPC ........................................................ 726/22
See application file for complete search history.

(56) References Cited

U.S. PATENT DOCUMENTS

| | | |
|---|---|---|
| 8,140,012 B1 | 3/2012 | Causey |
| 8,878,673 B2 | 11/2014 | Grant |
| 9,220,011 B1 | 12/2015 | Annan et al. |
| 9,552,708 B2 | 1/2017 | Grant |
| 9,602,508 B1 | 3/2017 | Mahaffey |

(Continued)

FOREIGN PATENT DOCUMENTS

KR    20120065762    6/2012

OTHER PUBLICATIONS

International Preliminary Report on Patentability cited in the International app No. PCT/US2020/016807; dated Aug. 10, 2021; 8 pp.

(Continued)

*Primary Examiner* — Josnel Jeudy
(74) *Attorney, Agent, or Firm* — Lempia Summerfield Katz LLC (57) ABSTRACT

A method of establishing security monitoring functionality on a device on retail display includes obtaining, by a processor of a server computer, a mobile device management (MDM) startup message from the device, determining, by the processor, whether the device is enrolled for MDM supervision, and if the device is enrolled for the MDM supervision, downloading, by the processor to the device, configuration data to support the MDM supervision and implementation of the security monitoring functionality.

18 Claims, 4 Drawing Sheets

(56) References Cited

U.S. PATENT DOCUMENTS

| | | | |
|---|---|---|---|
| 9,639,692 B1 | 5/2017 | Xue | |
| 9,665,913 B2 | 5/2017 | Loutit | |
| 9,728,054 B2 | 8/2017 | Grant | |
| 9,779,603 B1 | 10/2017 | Subramanian | |
| 9,928,703 B2 | 3/2018 | Grant | |
| 10,002,505 B1 | 6/2018 | Grant | |
| 10,438,469 B1 | 10/2019 | Subramanian | |
| 10,440,558 B1 * | 10/2019 | De Figueiredo Junior | H04L 41/08 |
| 10,475,307 B2 | 11/2019 | Grant | |
| 10,548,015 B2 | 1/2020 | Hui | |
| 10,965,734 B2 * | 3/2021 | Lang | H04L 67/10 |
| 2005/0086328 A1 * | 4/2005 | Landram | H04L 67/34 709/220 |
| 2006/0128305 A1 | 6/2006 | Delalat | |
| 2006/0206492 A1 | 9/2006 | Lipscomb | |
| 2006/0272020 A1 | 11/2006 | Gardner | |
| 2008/0120716 A1 | 5/2008 | Hall | |
| 2009/0253408 A1 | 10/2009 | Fitzgerald | |
| 2009/0253410 A1 | 10/2009 | Fitzgerald | |
| 2009/0293560 A1 | 12/2009 | Ikeguchi | |
| 2010/0273452 A1 | 10/2010 | Rajann | |
| 2010/0279673 A1 | 11/2010 | Sharp | |
| 2010/0279675 A1 | 11/2010 | Slack | |
| 2011/0072132 A1 | 3/2011 | Shafer et al. | |
| 2011/0076986 A1 | 3/2011 | Glendinning | |
| 2011/0215921 A1 | 9/2011 | Ben | |
| 2012/0075098 A1 | 3/2012 | Kuncl | |
| 2013/0019304 A1 | 1/2013 | Cai | |
| 2013/0210389 A1 | 8/2013 | Obaidi | |
| 2013/0219041 A1 | 8/2013 | Gardner | |
| 2013/0226742 A1 | 8/2013 | Johnson | |
| 2013/0281058 A1 | 10/2013 | Obaidi | |
| 2013/0326642 A1 | 12/2013 | Hajj | |
| 2014/0059828 A1 | 3/2014 | Reynolds et al. | |
| 2014/0075550 A1 | 3/2014 | Mirashrafi | |
| 2014/0150049 A1 * | 5/2014 | Kwon | H04W 12/12 726/1 |
| 2014/0223322 A1 | 8/2014 | Slack | |
| 2014/0298485 A1 | 10/2014 | Gardner | |
| 2014/0364099 A1 | 12/2014 | Pai | |
| 2014/0366164 A1 | 12/2014 | Hoefgen | |
| 2014/0372743 A1 | 12/2014 | Rogers et al. | |
| 2015/0040239 A1 | 2/2015 | Buerk | |
| 2015/0067785 A1 * | 3/2015 | Donnellan | H04W 12/126 726/4 |
| 2015/0089674 A1 | 3/2015 | Clapham | |
| 2015/0240531 A1 | 8/2015 | Blust | |
| 2016/0042620 A1 | 2/2016 | Dandie et al. | |
| 2016/0134930 A1 | 5/2016 | Swafford | |
| 2016/0142403 A1 * | 5/2016 | Lee | G06F 9/4416 726/7 |
| 2016/0227411 A1 | 8/2016 | Lundblade | |
| 2016/0267298 A1 | 9/2016 | Tucker | |
| 2016/0307415 A1 | 10/2016 | Marszalek et al. | |
| 2016/0344862 A1 | 11/2016 | Tucker | |
| 2017/0103647 A1 | 4/2017 | Davis | |
| 2017/0164267 A1 | 6/2017 | Marka | |
| 2017/0230515 A1 | 8/2017 | Velusamy | |
| 2017/0272950 A1 | 9/2017 | Venkataramanachari | |
| 2017/0359555 A1 | 12/2017 | Irani | |
| 2018/0211501 A1 | 7/2018 | Ewing | |
| 2018/0260587 A1 | 9/2018 | Peacock | |
| 2018/0276000 A1 * | 9/2018 | Roszak | G06F 9/452 |
| 2018/0288720 A1 | 10/2018 | Blaser | |
| 2018/0288721 A1 | 10/2018 | Blaser | |
| 2018/0288722 A1 | 10/2018 | Blaser | |
| 2018/0316381 A1 | 11/2018 | Sharma | |
| 2019/0035238 A1 | 1/2019 | Mcclintock | |

OTHER PUBLICATIONS

International Search Report and Written Opinion in International Application No. PCT/US2020/016807, dated Jun. 4, 2020, 13 pages.

ESR 08062018, European Search Report cited in corresponding European Patent Application No. 18160482.8; dated Aug. 6, 2018; 10 pages.

NFOA 02052020, Non Final Office Action cited in the corresponding U.S. Appl. No. 15/914,600; dated Feb. 5, 2020; 5 pp.

* cited by examiner

MDM-BASED PERSISTENT SECURITY MONITORING

CROSS-REFERENCE TO RELATED APPLICATION

This application claims the benefit of U.S. provisional application entitled "MDM-Based Persistent Security Monitoring," filed Feb. 5, 2019, and assigned Ser. No. 62/801,623, the entire disclosure of which is hereby expressly incorporated by reference.

BACKGROUND OF THE DISCLOSURE

Field of the Disclosure

The disclosure relates generally to security monitoring of electronic merchandise on display.

Brief Description of Related Technology

Product merchandise is routinely displayed in retail environments with a security mechanism to deter theft. In some cases, the security mechanism is a tether that ties the merchandise to a display fixture. In other cases, the security mechanism is a security device, such as an electronic tag, affixed to the product and configured to support a proximity detection scheme. In either case, the security mechanism attempts to deter theft while providing a consumer an opportunity to evaluate the product. For instance, the security device may allow the consumer to lift or otherwise inspect the product to assess its function and/or aesthetics. Allowing the consumer to lift the product gives the consumer a better opportunity to assess the weight and feel of the product, as well as interact with the various features and other aspects of the product. Despite allowing for such interaction, security devices and other security mechanisms may nonetheless undesirably restrict or inhibit consumer evaluation of the merchandise.

SUMMARY OF THE DISCLOSURE

In accordance with one aspect of the disclosure, a method of establishing security monitoring functionality on a device on retail display includes obtaining, by a processor of a server computer, a mobile device management (MDM) startup message from the device, determining, by the processor, whether the device is enrolled for MDM supervision, and if the device is enrolled for MDM supervision, downloading, by the processor to the device, configuration data to support the MDM supervision and implementation of the security monitoring functionality.

In accordance with another aspect of the disclosure, a method of establishing security monitoring functionality on a device on retail display includes obtaining, by a processor of a server computer, a mobile device management (MDM) startup message from the device, the MDM startup message being sent by the device as a result of a boot sequence implemented by the device, determining, by the processor, whether the device is enrolled for MDM supervision, and if the device is enrolled for the MDM supervision, downloading, by the processor to the device, configuration data to support the MDM supervision and implementation of the security monitoring functionality.

In accordance with yet another aspect of the disclosure, a system for establishing security monitoring functionality for a device on retail display includes a memory on which security provisioning instructions and mobile device management (MDM) instructions are stored, and a processor configured to execute the MDM instructions to implement a MDM service for the device. The processor is configured via execution of the security provisioning instructions to obtain a mobile device management (MDM) startup message from the device, determine whether the device is enrolled for MDM supervision, and if the device is enrolled for the MDM supervision, download configuration data to support the MDM supervision and implementation of the security monitoring functionality.

In connection with any one of the aforementioned aspects, the devices and methods described herein may alternatively or additionally include any combination of one or more of the following aspects or features. The configuration data includes instructions of an MDM agent on the device, the MDM agent being configured to cause the device to enter into a locked state upon receipt of a command from the server computer. The configuration data includes instructions of a security monitoring app on the device, the securing monitoring app being configured to monitor the device for a security trigger event. The security monitoring app is further configured to communicate with a further server computer to indicate that the security monitoring app is operational. The security monitoring app is further configured to provide a single-app mode in which the device resides in response to an MDM command from the server computer to enter a locked state. The device is configured to enable remote supervision via data stored in persistent memory, the data leading to the device sending the MDM startup message. The data causes the device to contact an enrollment service, the enrollment service identifying the server computer as an MDM service for the device. The method further includes determining, by the processor, whether the device has previously been provided with the MDM supervision by the server computer. If the device has not been previously provided with the MDM supervision, adding, by the processor, the device to an MDM service list of the server computer, and if the device has been previously provided with the MDM supervision, directing the device to enter into a locked mode after downloading the configuration data. Obtaining the MDM startup message occurs while the device is implementing a boot sequence. Obtaining the MDM startup message includes receiving the MDM startup message from the device. The processor is configured via execution of the security provisioning instructions to determine whether the device has previously been provided with the MDM supervision, and the processor is configured via execution of the MDM instructions to direct the device to enter into a locked mode after the configuration data is downloaded if the device has been previously provided with the MDM supervision.

BRIEF DESCRIPTION OF THE DRAWING FIGURES

For a more complete understanding of the disclosure, reference should be made to the following detailed description and accompanying drawing figures, in which like reference numerals identify like elements in the figures.

The disclosed methods, devices, and systems are susceptible of embodiments in various forms. Specific embodiments of the invention are illustrated in the drawing (and will hereafter be described) with the understanding that the disclosure is intended to be illustrative, and is not intended to limit the invention to the specific embodiments described and illustrated herein.

DETAILED DESCRIPTION OF THE DISCLOSURE

Systems and methods for security monitoring of merchandise on display are described. The merchandise is or includes an electronic device. Aspects of the security monitoring techniques of the disclosed systems and methods are implemented by the electronic device itself. The security monitoring may thus be provided in a manner integrated with the electronic device on display.

Aspects of the security monitoring techniques are implemented by server and/or other computers in communication with the electronic device. The communications may be or include supervised mode communications, e.g., mobile device management (MDM) communications. The MDM or other supervision-related aspects of the disclosed methods and system may also be used to maintain the persistence of the security monitoring functionality on the device being protected.

The disclosed systems and methods implement the security monitoring techniques to support an automatic bricking or other benefit denial of the merchandise. The device enters into a locked state upon occurrence of one or more trigger events. The locked state may also be initiated via an operator of a management service. The locked state may be an operational mode (e.g., a single app mode) of the security application (e.g., app) running on the device. Theft attempts are therefore deterred.

The integrated nature and other aspects of the security monitoring may permit the retail environment to avoid relying on tethers, security tags, proximity sensors, or other security mechanisms to deter theft. Alternatively, the integrated security monitoring provided by the disclosed devices and methods may be used in conjunction with such other security mechanisms.

The security monitoring is provided in a persistent manner despite using elements installed on the device that are non-persistent. For example, operation of an agent or app installed on the device to provide or otherwise support the security monitoring may be discontinued by, for instance, a power cycle or device reset. The security monitoring is nonetheless provided by the disclosed methods and systems in a persistent manner via MDM—or other supervision-related techniques to ensure that the elements are re-installed and operational.

The manner in which the security monitoring is provided is useful in connection with electronic devices that do not allow access to boot instructions or other firmware. Lack of access to the device firmware presents a technical problem. The firmware cannot be reconfigured to ensure that security monitoring instructions are persistently executed by the electronic device. Execution of the security monitoring instructions on the electronic device may thus be discontinued by a would-be thief or other user simply by, for instance, closing a security application (e.g., app), rebooting the device, or power cycling the device.

The boot instructions may nonetheless be relied upon to support persistence and provisioning of the security monitoring functionality on the device. In some cases, the boot instructions may enable the enrollment of the device in a supervision scheme or system. The execution of the boot instructions may thus provide an opportunity to confirm that the security monitoring functionality is installed on the device. In this way, a factory or other hard reset of the device that removes elements of the security monitoring functionality from the device may be thwarted.

The disclosed techniques differ from other attempts to deter theft via benefit denial by allowing such discontinuation. That is, the disclosed techniques allow, rather than prevent, a would-be thief to close the security application or otherwise terminate the execution of the security instructions on the electronic device. The security application may be an application (e.g., app) that may be closed just like all other user-initiated applications. The security application and/or other security instructions running on the electronic device are thus not persistent. For instance, the security instructions are not automatically or otherwise persistently executed due to storage in the firmware of the electronic device. Not relying on the firmware is useful, insofar as a manufacturer of the electronic device may not allow the firmware to be modified to include the security instructions.

The disclosed techniques provide security monitoring and benefit denial—despite the possibility of discontinuation of a security monitoring routine on the device—by relying on MDM-based or other supervision of the device. The supervision allows the device to send and receive supervised mode communications via a supervisory computer (e.g., a supervisory server computer) associated with implementing the supervision. In some cases, the supervised mode communications involve a command to enter into a locked mode. In other cases, the supervised mode communications involve provisioning the device with an agent, app, or other instructions or data used to implement the security monitoring functionality.

Some aspects of the security monitoring functionality involve a watchdog timing determination. For instance, the security monitoring may involve determining whether too much time has passed since receipt of a check-in message from the device being monitored. This timing analysis may be configured as a watchdog service implemented by a server computer. If too much time has passed since the previous message, the supervised mode communications are used to deliver a command to the electronic device to enter the locked mode.

The supervised mode communications may also be useful for maintaining the execution of the security instructions on the electronic device. This aspect of the disclosed methods and systems addresses the possibility that a would-be thief closes the app or otherwise discontinues the security monitoring routine on the electronic device. To combat this possibility, the supervised mode communications may be used to re-initiate the execution of the security instructions on the electronic device. The supervised mode communications may also be used to re-download and/or re-install a security application or other security instructions. In this way, the persistence of the security monitoring is effectively provided, albeit indirectly.

The disclosed methods and systems may provide the security monitoring services in conjunction with other integrated security services. For instance, the security instructions running on the electronic device may receive commands or other instructions to lock the electronic device, e.g., as a result of an alarm detected by an alarm system. Such commands may also be manually initiated from a management computer, e.g., a server computer associated with the alarm system. Conversely, the security instructions may be configured to delay or prevent a lock—even when the check-in message was delayed—due to the absence of an alarm. In these ways, the decision to lock or not lock the electronic device may occur at the device or server level.

The disclosed systems and methods provide effectively persistent security monitoring, avoiding the limitations of other integrated monitoring techniques. Integrated security monitoring presents a technical problem or challenge involving how to continue or sustain the implementation of the security monitoring if a user attempts to disable, shutdown, or otherwise discontinue the security monitoring. For instance, a user attempting to steal the electronic merchandise may close an application providing security monitoring, shutdown the electronic device, or perform a factory reset of the electronic device. The disclosed devices and methods provide a technical solution(s) to this technical problem despite not having to rely on, for instance, (i) execution of security monitoring instructions in boot instructions during a boot (e.g., startup) sequence, (ii) storing security instructions on a persistent memory (e.g., as firmware) of the electronic device, (iii) execution of security monitoring instructions within a background service (as opposed to, for instance, an application running in the foreground or otherwise accessible to the user via a user interface), or (iv) special, proprietary background services, such as an Android Persistent Service (APS).

The disclosed systems and methods address other technical problems and challenges presented by integrated security monitoring. For instance, the amount of space available in persistent memory may be limited. The disclosed methods and systems may conserve space in the persistent memory by effectively providing persistence without relying on or consuming persistent memory.

Yet another example of a technical problem or challenge addressed by the disclosed devices and methods involves the temporary nature of the security monitoring. As merchandise for sale, the electronic device will eventually cease to be on display. The security monitoring of the disclosed devices and methods should no longer be implemented once the electronic device is sold or otherwise transferred. The disclosed systems and methods are capable of discontinuing the security monitoring by exiting or discontinuing the supervised mode.

The disclosed systems and methods are not limited to any particular type of electronic merchandise or type of retail environment or site. The integrated nature of the disclosed systems and methods allows the nature of the retail environment to vary considerably. For instance, the retail site may be a kiosk rather than a standalone store with a dedicated entrance or exit. The nature of the electronic merchandise may also vary considerably. While the disclosed methods and systems may be useful in connection with smartphones and other portable electronic devices, the electronic devices may or may not be handheld or portable. For instance, the disclosed systems and methods may be useful in connection with televisions and other large scale devices.

Figure 1:
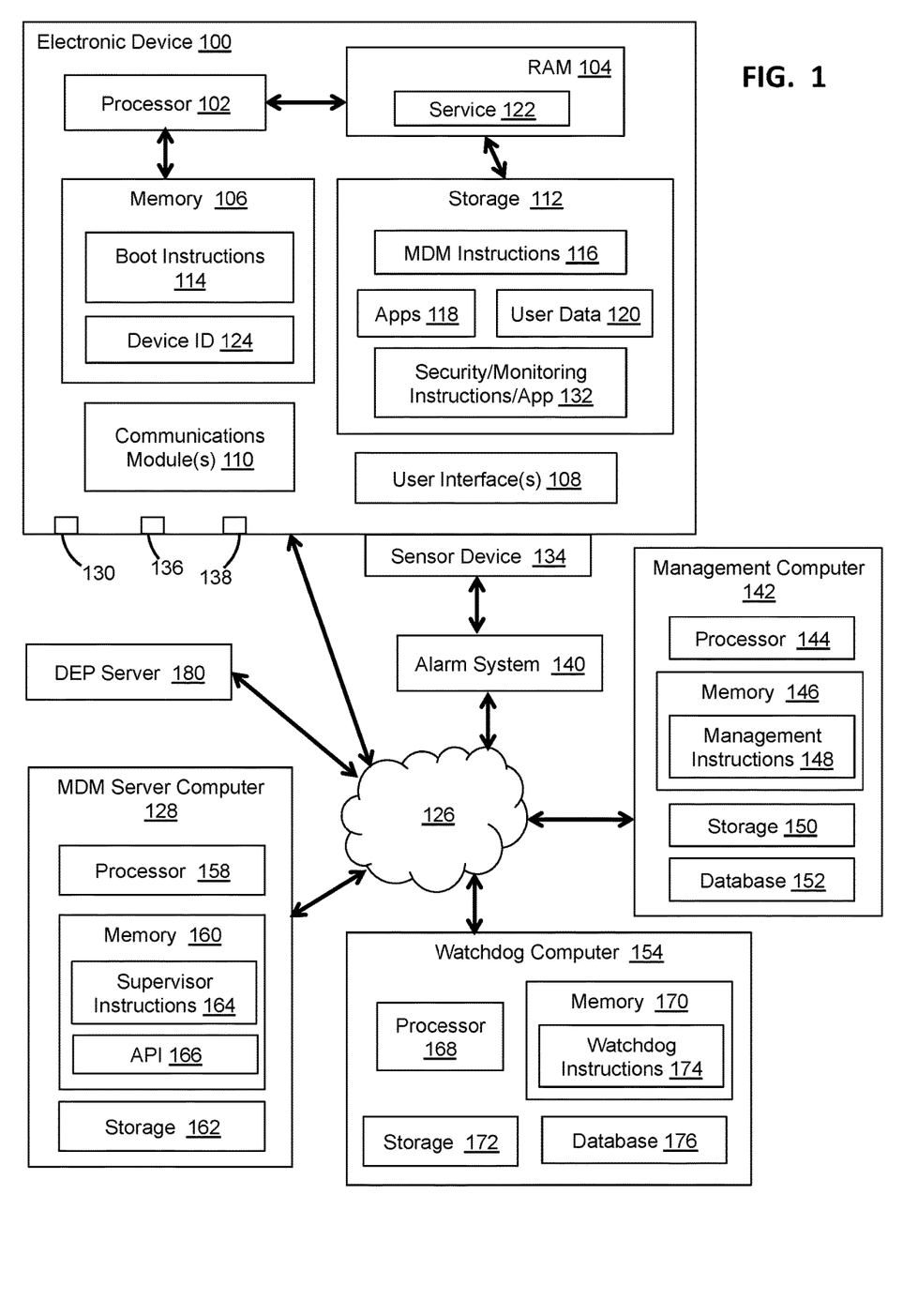
FIG. 1 is a block diagram of a system for providing integrated security monitoring for an electronic device on retail display in accordance with one example.

Turning to the drawing figures, FIG. 1 depicts a security system for providing security for an electronic device 100 on retail display. The electronic device 100 may be merchandise for sale and/or part of an exhibit or other display of items for sale. For example, the electronic device 100 may be a smartphone, tablet, or laptop computer. The electronic device 100 may or may not be considered to be or include a computer or computing device. For instance, the electronic device 100 may be a television or monitor. The size, form factor, and other characteristics of the electronic device 100 may thus vary considerably.

The retail display may be in a store or other retail site or environment. The retail display may include one or more fixtures, such as a display stand, base, etc. The retail display and environment may have other security monitoring systems in operation to prevent or deter theft of the electronic device 100 and other merchandise on display. For instance, a wireless security system may be provided, such as the system described in U.S. Patent Publication No. 2016/0307415 ("Apparatus, System and Method for Monitoring a Device within a Zone"), the entire disclosure of which is hereby incorporated by reference. Alternatively or additionally, tethers or other cable-based security measures may be used, including, for instance, cable-based apparatus having a retractable reel and other components for securing merchandise to a display fixture as described in U.S. Patent Publication No. 2014/0059828 ("Apparatus, System and Method for Securing, Attaching and/or Detaching a Device to a Fixture"), the entire disclosure of which is hereby incorporated by reference.

The electronic device 100 is configured to provide security monitoring or other security-related functions for itself. Such self-monitoring may replace or augment the security measures established by other items in the retail environment. For instance, the self-monitoring may provide redundancy, which may be useful in circumstances in which a site system fails or is otherwise disabled, or when the cutting of a tether or cable is not detected. The self-monitoring may also be used as a theft deterrent as described herein.

The electronic device 100 includes a processor 102. The processor 102 executes instructions to implement security monitoring methods as described herein. The processor 102 may not be dedicated to implementing security-related tasks. Indeed, the processor 102 may be the primary processor of the electronic device 100. For instance, the processor 102 may be used to perform any number of non-security-related processing tasks or operations for the electronic device 100. In some cases, the processor 102 is or includes a central processing unit (CPU) or other general-purpose processing unit. For example, the processor 102 may be a microprocessor, microcontroller, programmable logic array (PLA), or field programmable gate array (FPGA). Alternatively or additionally, the processor 102 is or includes dedicated or specific processing functionality. For instance, the processor 102 may be or include a graphics processing unit (GPU), a digital signal processor (DSP), or other type of application-specific processor or processing unit. In some cases, the processor 102 is implemented as an application-specific integrated circuit (ASIC). The processor 102 may include one or more processing cores or other units integrated with one another to any extent. The processor 102 may be provided on one or more integrated circuits or integrated circuit (IC) chips. The processor 102 may be integrated with one or more other components of the electronic device 100, such as a memory unit or a communications module. For example, in some cases, the processor 102 is a component of a system-on-a-chip (SoC).

The electronic device 100 includes one or more memory units on which instructions are stored. The instructions configure the processor 102 or other cause the processor 102 to implement tasks or other operations. In the example of FIG. 1, the electronic device includes a random access memory (RAM) or other volatile memory 104 and a persistent memory 106. Both of the memories 104, 106 may be directly addressable and accessible by the processor 102 via, for instance, a memory bus. The persistent memory 106 may be read-only memory (ROM) or other non-volatile memory. Firmware for the electronic device 100 may be stored on the persistent memory 106. Each of the RAM 104 and the persistent memory 106 may include one or more memory units or memories (e.g., memory chips).

In the example of FIG. 1, the electronic device 100 includes one or more user interfaces 108 and one or more communication modules 110. The user interface 108 establishes the manner in which a user interacts or otherwise uses the electronic device 100. For instance, the user interface 108 may include a display, such as a touchscreen. Alternative or additional user interfaces may be provided, including, for instance, a keyboard, speaker, microphone, or other input/output device. The communication module 110 supports communications, such as wireless communications, with remote devices. In some cases, the communication module 110 may include an antenna, a transceiver, and/or other components for supporting the communications. The communications may be in accordance with various communication protocols.

The electronic device 100 also includes a storage device 112. Data stored on the storage device 112 is not directly addressable by the processor 102, in contrast to the memories 104, 106. In the example shown, data on the storage device 112 is copied to the RAM 104 prior to use by the processor 102. The storage device 112 may be or include flash storage in the form of a solid state drive (SSD). Alternatively or additionally, the storage device 112 is or includes a hard disk drive. The storage device 112 may include one or more storage devices. The configuration, construction, storage technology, and other characteristics of the storage device 112 may vary.

Boot instructions 114 are stored on the persistent memory 106. In some cases, the boot instructions 114 are stored as firmware of the electronic device 100. The firmware of the electronic device 100 may thus include the boot instructions 114 in some cases. The processor 102 is configured to execute the boot instructions 114 during a boot sequence of the electronic device 100. The boot sequence may be any startup sequence, including, for instance, a sequence implemented at a power cycle, power-on, factory or other reset, or other restart or startup. In some cases, the boot instructions 114 are implemented as a basic input/output system (BIOS) routine or a portion thereof. In other cases, the boot instructions 114 may be called by a BIOS routine as, for instance, a subroutine. The boot instructions 114 are not limited to instructions set forth in, or called by, a BIOS routine. For example, the boot instructions 114 may be implemented in connection with a loading of an operating system for the electronic device 114.

The boot instructions 114 may include instructions directed to supervision of the electronic device 100. Execution of the supervision instructions by the processor 102 may involve generation of a message during the boot sequence to establish whether the device 100 will reside in a supervised mode. As described herein, the message may be sent to a server computer having a data store identifying those devices as being enrolled in a supervision program. In the example of FIG. 1, the message is sent to a Device Enrollment Program (DEP) server 180, which may be useful in connection with establishing supervision of mobile devices manufactured by Apple Computer and operating the iOS operating system. The message may include a device identification number (ID) 124, such as a serial number or international mobile equipment identity (IMEI) number. Other servers and service arrangements may be used in connection with other devices and operating systems. The supervision instructions may thus ultimately cause the device 100 to run in a supervised mode.

Operation in the supervised mode allows the electronic device 100 to be managed by a server computer or other remote device, e.g., of an enterprise. In the example of FIG. 1, the supervisory server computer is or includes an MDM server computer 128. The MDM server computer 128 is used to provision and otherwise maintain the security monitoring functionality of the device 100 and to support the automatic locking of the device in connection with security events, as described below. In some cases, the supervision is provided in accordance with a mobile device management (MDM) or enterprise mobility management (EMM) platform, protocol or standard. Other platforms, protocols or standards may be used. Any supervision services provided by such platforms, protocols, or standards are considered to be MDM services as the terms "mobile device management" and "MDM" are used herein.

Instructions 116 (e.g., MDM instructions) and other data related to the supervised mode may be stored in the storage 112. Alternatively or additionally, such data may be stored as firmware in the memory 106, and/or elsewhere on the device 100. In some cases, the boot instructions 114 may include instructions directed to triggering the execution of the supervision-related instructions 116. For example, the processor 102 is configured to execute the boot instructions 114 during the boot sequence to initiate execution of the supervision-related instructions 116. In some cases, the boot instructions 114 may include one or more subroutine or other calls or other references to the supervision-related instructions 116. The supervision functionality is thus initiated upon any rest or restart of the electronic device 100.

The nature of the supervision-related instructions 116 may vary. For instance, the supervision-related instructions 116 may alternatively or additionally include or otherwise be directed to specifying configuration details for the device 100 and/or data indicative of the supervisory server computer or other remote device.

Initiation of the execution of the supervision-related instructions 116 at reset or startup is accomplished despite storage of the supervision-related instructions 116 outside of the persistent memory 106. The supervision-related instructions 116 may be stored in the storage device 112 alongside applications 118 and user data 120. The applications 118 may be or include applications (e.g., apps) installed on the electronic device 100. The user data 120 may be or include data generated as a result of execution of, or stored for use by, one of the applications 118 (e.g., configuration data).

The nature of the boot instructions 114 related to the supervision-related functionality may vary. For instance, the manner in which the boot instructions 114 initiates execution of the supervision-related instructions 116 may vary. In some cases, the supervision-related portions of the boot instructions 114 are configured as a callout or other reference to the supervision-related instructions 116. The callout or other reference may be set forth in the boot instructions 114 in the context of establishing a persistent or other background application or service 122 to be executed or implemented by the electronic device 100. As described below, the background service 122 may be or include an agent configured to support MDM or other supervised mode communications with the server computer 128. Instructions and/or other data associated with the background service 122 may be stored in the RAM 104 for use by the processor 102. The callout or other reference limits the amount of persistent memory consumed by the security-related boot instructions 114.

In other cases, the boot instructions 114 set forth instructions beyond a callout or reference to the supervision-related instructions 116. For instance, the boot instructions 114 may include instructions directed to determining whether the supervision instructions 116 should be called or otherwise initiated. To that end, for instance, the device ID 124 may be accessed from the persistent memory 106. Processing of the boot instructions 114 may cause the processor 102 to send a query with the device ID 124 to determine whether the electronic device 100 (e.g., this particular instance of the electronic device 100) should be subjected to supervision. In the example of FIG. 1, the query is sent via the internet 126 to either the DEP server 180 and/or the supervisory server computer device 128 (e.g., MDM server computer) or other server computer. Network communications with the server computer 128 may be supported by an antenna 130 of the electronic device 100. The supervisory computer device 128 may be configured to provide or otherwise support the implementation of the supervision functionality (e.g., a supervised mode of operation) on the electronic device 100. Other networked and non-networked devices may be contacted or accessed to determine whether the supervision functionality should be implemented. The supervision functionality may be initiated in other ways, including, for instance, a flag or other configuration data setting in the memory 106.

Security monitoring functionality is not directly provided via execution of the boot instructions 114 or the supervision instructions 116. Security monitoring functionality is instead provided via execution of security monitoring instructions 132. The security monitoring instructions 132 may be stored on the storage device 112 as an app or other application. The security monitoring instructions 132 are thus not executed or otherwise provided as a persistent service. As a result, the execution of the security monitoring instructions 132 may be subject to control via the user interface 108. The app or other application in which the security monitoring instructions 132 are executed may thus be closed, discontinued, or otherwise controlled by an employee of the retail site or another user, including a would-be thief. Persistence of the security monitoring functionality is instead established indirectly via operation in the supervised mode.

The processor 102 may be configured, via the execution of the security monitoring instructions 132, to monitor the retail display of the electronic device 100 for a security trigger event. The monitoring for the security trigger event may use one or more components of the electronic device 100. For example, the electronic device 100 may include an accelerometer or other sensor device 134 configured to detect and characterize a theft attempt or other activity. One or more antennas or other electromagnetic circuitry of the electronic device 100 may be used to detect or determine distances. The monitoring may also involve detecting a disconnection at one or more ports or interfaces of the electronic device 100, such as a data port 136 and/or a power port 138. Examples of trigger events involving such sensors and circuitry include removing the electronic device 100 from a proximity zone, moving the electronic device 100 in a manner indicative of theft, or one or more disconnections of the electronic device 100, such as disconnection form a power source or a wired or wireless network (e.g., wifi network).

The monitoring for a trigger event may also involve communications or other interaction with another device. For example, the electronic device 100 may receive a signal or message from an alarm unit or other system 140. An attempted theft of some merchandise in the retail environment may thus trigger an alarm event for other merchandise on display. Other types of trigger events may be used, including, for instance, trigger events involving the operation of the electronic device 100 itself.

Other security system component may trigger a security event or send a command to lock the device 100. In the example of FIG. 1, the security system includes a management computer device 142 directed to managing security services for one or more electronic devices. The management computer device 142 may be or include a server computer in communication with the electronic device 100 via the internet 126. The management computer device 142 may provide an operator with an option of manually or otherwise triggering device locks or other security events. To that end, the management computer device 142 includes a processor 144 and a memory 146 on which management instructions 148 are stored for execution by the processor 144. The management instructions 148 may be loaded from a storage device 150, on which a database 152 of a list of electronic devices being monitored may also be stored. The management instructions 148 may cause the processor 144 to generate one or more user interfaces (on the management computer device 142 or a client device or other computing device in communication therewith) so that an operator may access the list to view the electronic devices being monitored and to select various operations (e.g., a device lock) to implement thereon.

The manner in which the management functionality is provided may vary from the example shown. For instance, in some cases, the management computer device 142 provides the management functionality as a service to a number of client computing devices. The client computing devices may be portable or other computing devices associated with a particular retail site, retailer, or other user entity. The management computer device 142 may be integrated to any desired extent with other components of the security system described herein. For example, the management computer device or a client thereof may be integrated with the alarm system 140 or other on-site component of the security system.

Upon detection of the trigger event, the execution of the security monitoring instructions 132 may cause the processor to lock the user interface(s) 108 of the electronic device 100. For instance, a touchscreen or other display may display a warning message regarding a locking of the electronic device 100 until the trigger event ends. The warning message may continue to be displayed until the trigger event is no longer present.

The nature of the locking may vary with the type of trigger event. In some cases, the security monitoring instructions 132 define multiple levels of locking. For instance, a major trigger event may cause the security monitoring instructions 132 to configure the processor 102, upon the detection of the trigger event, to generate an alarm that cannot be deactivated by merely discontinuing the trigger event. Unlocking the electronic device 100 may need to involve a key, code, or other disarming mechanism. In contrast, some trigger events may be sufficiently minor, such that removal of the trigger event automatically unlocks the electronic device 100. Still other levels of trigger events may be defined and used, such as primary and secondary trigger events, as described below.

Whether major or minor, the trigger events may be defined by the security monitoring instructions 116 such that the user interface 108 is locked before removal of the electronic device 100 from the retail site. Such immediacy of the locking may help to deter and/or prevent theft. The nature, extent, duration, unlocking and/or other characteristics of the lock may vary considerably.

The trigger event and locking may not involve a theft attempt. For instance, the security monitoring instructions 132 may be directed to preserving a display state of the electronic device 100. In some cases, the trigger event may involve a user attempt to sign in/out of an application or service. Signing out of a service may load personal data or otherwise personalize the electronic device 100 in a manner inappropriate for a retail environment. The monitoring instructions 132 may detect an attempt at signing out of a user account directed to retail display. The locking may thus inhibit the customization of the electronic device 100. The monitoring instructions 132 may alternatively or additionally alert a store employee of the need to wipe or clear user data from the electronic device 100. In some cases, the monitoring instructions 132 configure the processor 102 to prompt the store employee, e.g., after an unlocking, to initiate a device wipe or other housekeeping.

The supervision instructions 116 may be used to address circumstances in which the execution or other functionality of the security instructions 132 is discontinued or disabled. The security functionality is not provided by implementing instructions stored in the persistent memory 106 or provided by a persistent service, such as the persistent service 122. Instead, the security app, application, or other set of functions supported by the security instructions 132 may be closed by a user, such as a would-be thief. The security app or application is thus not necessarily protected from such discontinuation circumstances.

The security functionality relies on check-in or other messaging provided by the security app or other instructions 132 to address such circumstances. Execution of the security instructions 132 causes the processor 102 to send a message to a watchdog computer 154. The message may be sent periodically or regularly. As described below, receipt of the message within a predetermined timeframe is used to determine whether the device 100 should remain unlocked. If the message is not received within the predetermined timeframe, the device 100 may be locked (e.g., be directed to enter into a locked mode) due to a possible theft attempt, as described below.

The message may be configured as a check-in message, i.e., a message in which the device 100 checks in with the watchdog computer 154. The message may include status data regarding the operational status of the device 100. For instance, the status data may indicate whether one or more trigger events have occurred.

The watchdog server computer 154 is configured to determine whether the amount of time elapsed since a previous message from the device 100 exceeds a predetermined time. If the device 100 fails to check-in via the message within the predetermined time, then the electronic device 100 is directed to enter into a locked mode. Alternatively or additionally, the message is sent in response to a request from the watchdog server computer 154. The watchdog server computer 154 then determines whether the message is received or sent within a predetermined time relative to the request.

In the example of FIG. 1, the check-in messaging and the determination is handled and provided by the watchdog computer 154. The messaging may involve additional or alternative server computers. For instance, the check-in message and/or request may be sent via the MDM server computer 128. The check-in messaging may thus be configured as a supervised mode communication. The supervisory server computer 128 and the watchdog computer 154 may be integrated with one another to any desired extent.

The supervisory server computer 128 may be or include one or more networked computing devices in communication with the electronic device 100. The computing device(s) may be disposed in, or made available via, a private or public cloud computing infrastructure in communication with the internet 126. In the example shown, the supervisory server computer 128 includes a processor 158, a memory 160, and a storage device 162. Supervisor instructions 164 are stored on the memory 160 for execution by the processor 158. The processor 158 of the supervisory server computer 128 is configured via execution of the supervisor instructions 164 to implement MDM or other supervision functionality, including the supervised mode communications. In the example of FIG. 1, the supervisor instructions 164 and/or other instructions define an application program interface (API) 166.

The API 166 is used by the watchdog computer 154 and other server computers to direct the supervisory server computer 128 to, in turn, direct the device 100 to enter into the locked state. For example, the watchdog computer 154 may send an API call to the supervisory server computer 128. API calls may also be used by, for instance, the management computer 142 to direct the device 100 to enter into the locked state. For example, a store manager or other operator of the management computer 142 may wish to lock one or more devices within a respective retail location. Using such API calls, management instructions 148 may configured a processor 144 of the management computer 142 to issue a storewide locking of all devices within a respective retail location.

The watchdog computer 154 may be or include one or more networked computing devices. The watchdog computer 154 and the supervisory server computer 128 are in communication with one another. The computing device(s) may be disposed in, or made available via, a private or public cloud computing infrastructure in communication with the internet 126. In the example shown, the watchdog computer 154 includes a processor 168, a memory 170, and a storage device 172. Watchdog or other security monitoring instructions 174 are stored on the memory 170 for execution by the processor 168. The processor 168 of the watchdog computer 154 is configured via execution of the watchdog or other security monitoring instructions 174 to implement a security monitoring service for the electronic device 100.

The watchdog computer 154 is configured via execution of the security monitoring instructions 174 to determine whether a predetermined amount of time has elapsed since a timing of a previous message from the electronic device 100. For example, the electronic device 100 may be configured via the supervision instructions 116 to send a message at least once every two minutes, but other time intervals may be used.

The watchdog computer 154 is configured via execution of the security monitoring instructions 174 to direct the supervisory server computer 128 to send, to the electronic device 100, a command via the supervised mode communications to enter into a locked state if the timing of the message is not within the predetermined amount of time.

The supervised server computer 128 may be directed by other computers to send the command. For instance, the management computer 142 may rely on the supervisory server computer 128 and the supervised mode communications to send a command to cause the electronic device 100 to enter the locked state.

The manner in which the device 100 is locked may vary. In some cases, the security app or other security instructions 132 being executed on the electronic device 100 are used to implement the device lock. For example, the device lock may be implemented by entering a single app mode defined by the security instructions 132. The single app mode may be enforced or otherwise supported via the supervision instructions 116. For example, the supervised mode may enable the supervisory server computer 128 to direct the electronic device 100 to enter the single app mode of the security app or other instructions 132.

Other commands may be sent via the supervised mode communications to address various circumstances present at the electronic device 100. For instance, the supervised mode communications may address the closing or disabling of the security application on the electronic device 100. In some cases, the closing of the security application may, for instance, lead to the lack of a timely check-in or other message to the supervisory server computer 128. In other cases, the check-in message may indicate that the security application has been closed. In either case, the supervised mode communications may be used to restart the security application on the device 100.

The server computer 128 and the watchdog computer 154 may be use to implement a number of security monitoring techniques. Further details regarding the security monitoring techniques are set forth below.

The MDM instructions 116 may be configured to cause the processor 102 to implement functions related to device management, persistency, locking, various local triggers (e.g., power loss, geofence, SSID tether), device data collection, and other security-related functions, such as an audible alarm.

The security instructions 132 may be configured to cause the processor 102 to implement functions related to functionality not provided via the supervision, such as enhanced geolocation, additional local triggers (e.g., power-loss lock, etc.), additional data reporting (e.g., lift/place events), audible alarm, custom lock screens, etc.

The supervision may be supported via various enrollment services, and are not limited to Apple DEP. The enrollment service may or may not be provided by the manufacturer (e.g., OEM) of the device. Examples include Samsung Knox and Google ZTE. The enrollment service may support various functions, including, for instance, mass deployment, additional levels of persistency, and additional remote device management.

The MDM or other supervision server computer 128 may provide backend services directed to remote device management, persistency, locking, and various remote triggers, such as geolocation, device data reporting, etc. The MDM server computer 128 may be linked with an OEM enrollment service (e.g., the DEP server 180) for additional security and functionality.

The management server computer 142 may provide a remote user interface to manually lock, unlock, and monitor the status of the device 100. The management server computer 142 may communicate through API calls to the MDM server 128 and/or other cloud servers, such as the watchdog server computer 154. Examples of actions include lock a device or lock all devices in a user's list of secured devices.

The watchdog server computer 154 may provide additional security by remotely monitoring the device 100 via, e.g., the app or other security instructions 132 running on the device 100, to make sure the app is operating correctly and, if not, communicate (e.g., directly or indirectly) with the MDM server 128 (e.g., through API calls) to perform actions, such as auto-locking of the device 100.

Device management, locking and other functionality may be triggered locally by the MDM agent or other instructions 116, remotely from the MDM server 128 communicating with the MDM agent 116, or remotely through API calls to the MDM server 128 from the security app 132, the management computer 142, or the watchdog server computer 154.

The device 100 is enrolled in one or more supervision accounts to maintain the effective persistence of the MDM instructions 116 and the security instructions 132 (e.g., an MDM agent and a security app) on the device 100. In the example of FIG. 1, the device 100 is enrolled in a DEP account, which, in turn, is linked to an MDM account associated with the MDM server computer 128. The device 100 may be a DEP-enabled device via incorporation of one or more instructions in the boot instructions 114 directed to DEP and supervision enrollment. As a DEP-enabled device, the device ID 124 is added to a DEP account stored or otherwise associated with the DEP server 180. The data stored on the DEP server 180 associates the DEP account with the MDM server computer 128, thereby establishing supervision of the device 100 by the MDM server computer 128. In other cases, the device 100 is enrolled in only a single account for supervision.

As a result of establishing the supervision of the device 100, when the device 100 is first powered up, execution of the boot sequence will cause the device 100 to automatically check to see if the device 100 is assigned to a DEP account (because the device 100 is a DEP-enabled device). If the device 100 is assigned to a DEP account, the device 100 may auto-enroll itself in the DEP account and then connect with the MDM server computer 128 linked to the DEP account. The DEP server 180 thus automatically enables the device 100 to be supervised by the linked MDM server computer 128.

The device 100 may also auto-enroll itself in the linked MDM account and loads whatever MDM profile is set up on that account. The MDM profile may include configuration settings and other data (including data enabling supervision), the MDM instructions 116 (e.g., an MDM agent), and the security instructions 132 (e.g., the security app).

Having supervision of the device 100 allows the device 100 to be directed to enter into a locked state. The supervision may also be used to unlock a device. Such locking and unlocking may be implemented through the MDM server computer 128, e.g., through an MDM console or through MDM API calls.

In the foregoing manner, the device 100 is enrolled in DEP, enrolled in an MDM service, provisioned with settings, and software, and remotely supervised by the MDM server computer 128. At this point even if a thief were to factory reset the device 100, the device 100 will repeat all the steps above as soon as it goes through the setup and the device will be re-enrolled and supervised again.

Figure 2:
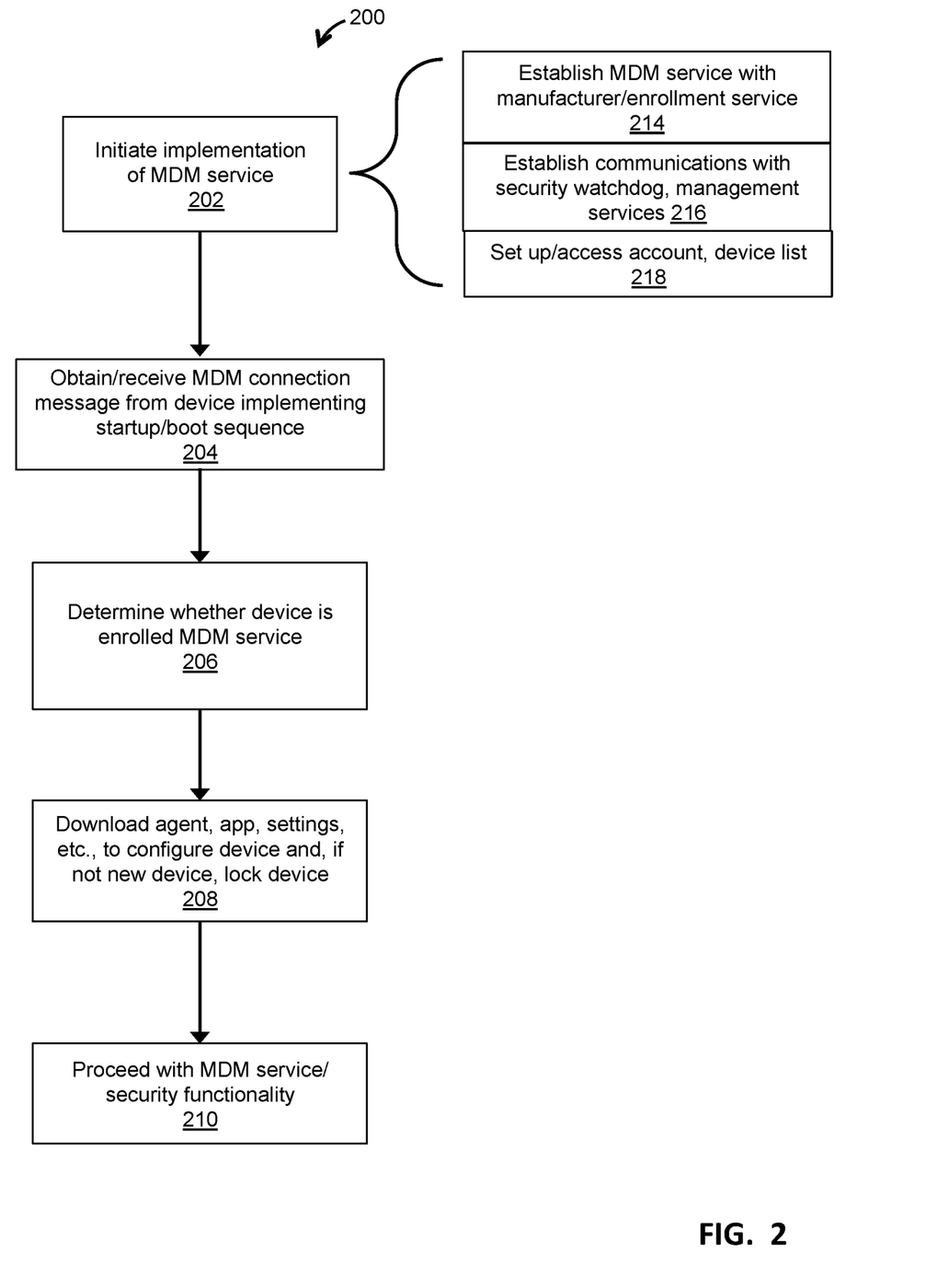
FIG. 2 is a flow diagram of a method of establishing persistent security monitoring functionality for an electronic device on retail display using mobile device management (MDM) in accordance with one example.

FIG. 2 is a flow diagram of a method 200 of establishing security monitoring for an electronic device on retail display. The method 200 is implemented by one or more of the above-described processors. For instance, the method 200 may be implemented by the processor 158 of the MDM server computer 128 described above in connection with FIG. 1. The characteristics of the processor and the server computer may vary from the examples described above.

The acts of the method 200 may be implemented in accordance with supervisor instructions 164 (FIG. 1) and/or other instructions.

The method 200 establishes security monitoring functionality for a device, such as the device 100 (FIG. 1). The method 200 includes obtaining, by a processor of a server computer, a mobile device management (MDM) startup message from the device, determining, by the processor, whether the device is enrolled for MDM supervision, and if the device is enrolled for MDM supervision, downloading, by the processor to the device, configuration data to support the MDM supervision and implementation of the security monitoring functionality.

The configuration data may include instructions of an MDM agent on the device, the MDM agent being configured to cause the device to enter into a locked state upon receipt of a command from the server computer. The configuration data may include instructions of a security monitoring app on the device, the securing monitoring app being configured to monitor the device for a security trigger event. The security monitoring app may be further configured to communicate with a further server computer to indicate that the security monitoring app is operational. The security monitoring app may be further configured to provide a single-app mode in which the device resides in response to an MDM command from the server computer to enter a locked state. The device may be configured to enable remote supervision via data stored in persistent memory, the data leading to the device sending the MDM startup message. The data may cause the device to contact an enrollment service, the enrollment service identifying the server computer as an MDM service for the device. The method may further include determining, by the processor, whether the device has previously been provided with the MDM supervision by the server computer, if the device has not been previously provided with the MDM supervision, adding, by the processor, the device to an MDM service list of the server computer, and if the device has been previously provided with the MDM supervision, directing the device to enter into a locked mode after downloading the configuration data. Obtaining the MDM startup message may occur while the device is implementing a boot sequence. Obtaining the MDM startup message may include receiving the MDM startup message from the device.

These and/or other aspects of the method 200 are depicted in FIG. 2 in connection with acts 202-218.

Figure 3:
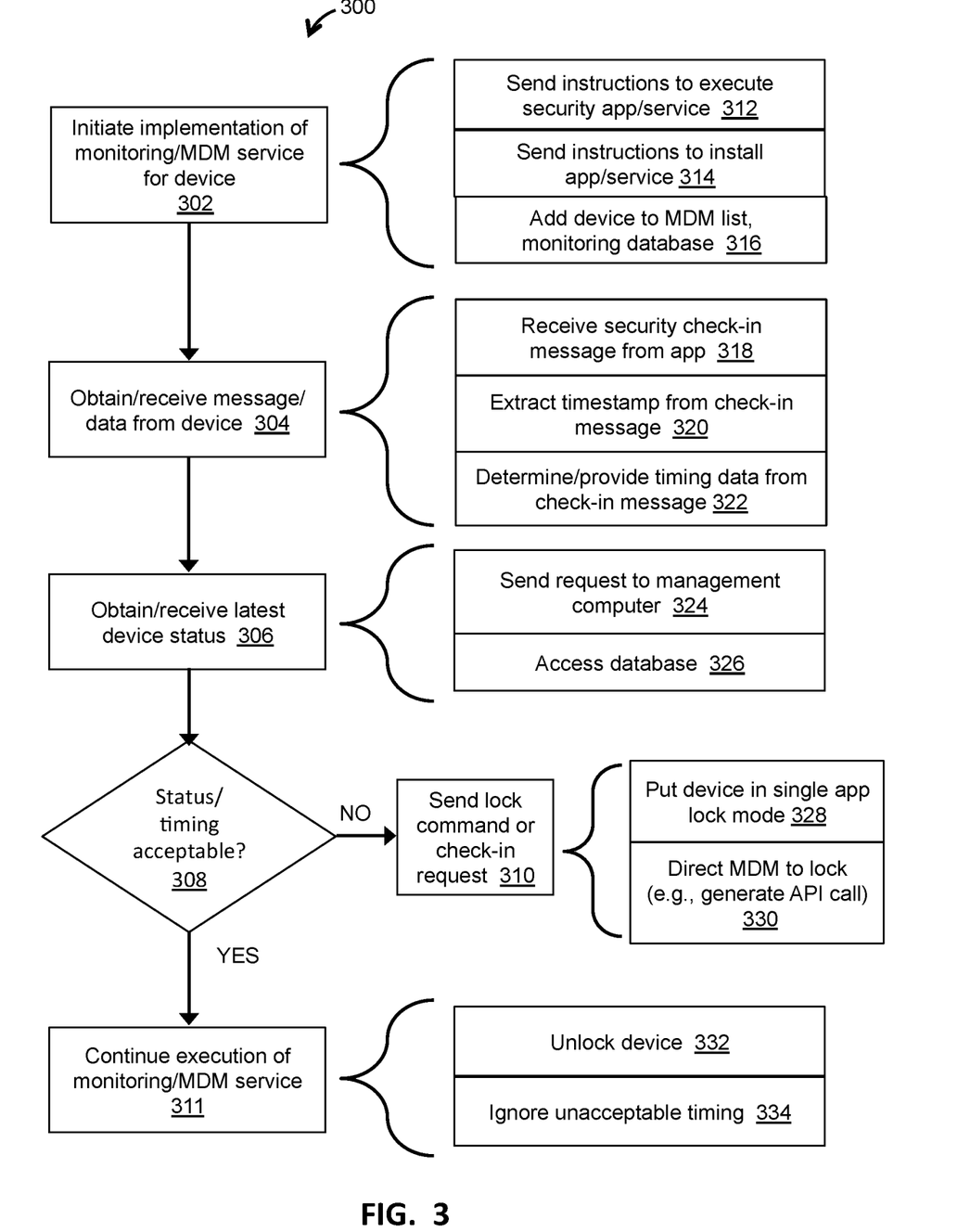
FIG. 3 is a flow diagram of a method of providing security monitoring functionality for an electronic device on retail display using via a watchdog trigger check-in procedure in accordance with one example.

FIG. 3 depicts a method 300 of monitoring an electronic device on retail display. The method 300 is implemented by one or more of the above-described processors. For instance, the method 300 may be implemented by the processor 168 of the watchdog server computer 154 described above in connection with FIG. 1. The characteristics of the processor and the server computer may vary from the examples described above.

The acts of the method 200 may be implemented in accordance with watchdog instructions 174 (FIG. 1) and/or other instructions.

The method 300 includes receiving, by a processor of a server computer, a message from the device indicative of whether security instructions stored in a memory of the device are being executed on the device, determining, by the processor, whether time elapsed since the message was received exceeds a threshold, and if the time elapsed exceeds the threshold, sending, by the processor, a command to automatically cause the device to enter into a locked state.

The method 300 alternatively or additionally includes receiving, at least one server computer, data indicative of whether a security trigger event has occurred in connection with the device, sending, by the at least one server computer, a request to the device that the device send a check-in message to the server computer, the check-in message being indicative of whether security instructions are being executed on the device, and sending, by the at least one server computer, a command to automatically cause the device to enter into a locked state if the check-in message is not received within a predetermined time period.

Sending the command may include directing, by the processor, a mobile device management (MDM) server to cause the device to enter the locked state. Directing the MDM server may include generating, by the processor, an application programming interface (API) call to the MDM server. The command may include a mobile device management (MDM) communication. Sending the command may include sending, by the processor, the command to the device. The method 300 may further include receiving, by the processor, data indicative of a security trigger event involving the device. The method 300 may further include sending, by the processor in response to receiving the data, a command to lock all devices at a retail location at which the device is located. The method 300 may further include sending, by the processor, a request to the device that the device check-in with the server computer to indicate that the security instructions are being executed on the device. The message may include data representative of a timing of the message. The security instructions may be executed on the device in a non-persistent application. The locked state may be an operational mode of an application defined by the security instructions in which the application causes the device to run in a single-application mode. The method 300 may further include sending, by the at least one server computer in response to receiving the data, a command to lock all devices at a retail location at which the device is located.

These and/or other aspects of the method 300 are depicted in FIG. 3 in connection with acts 302-334.

Figure 4:
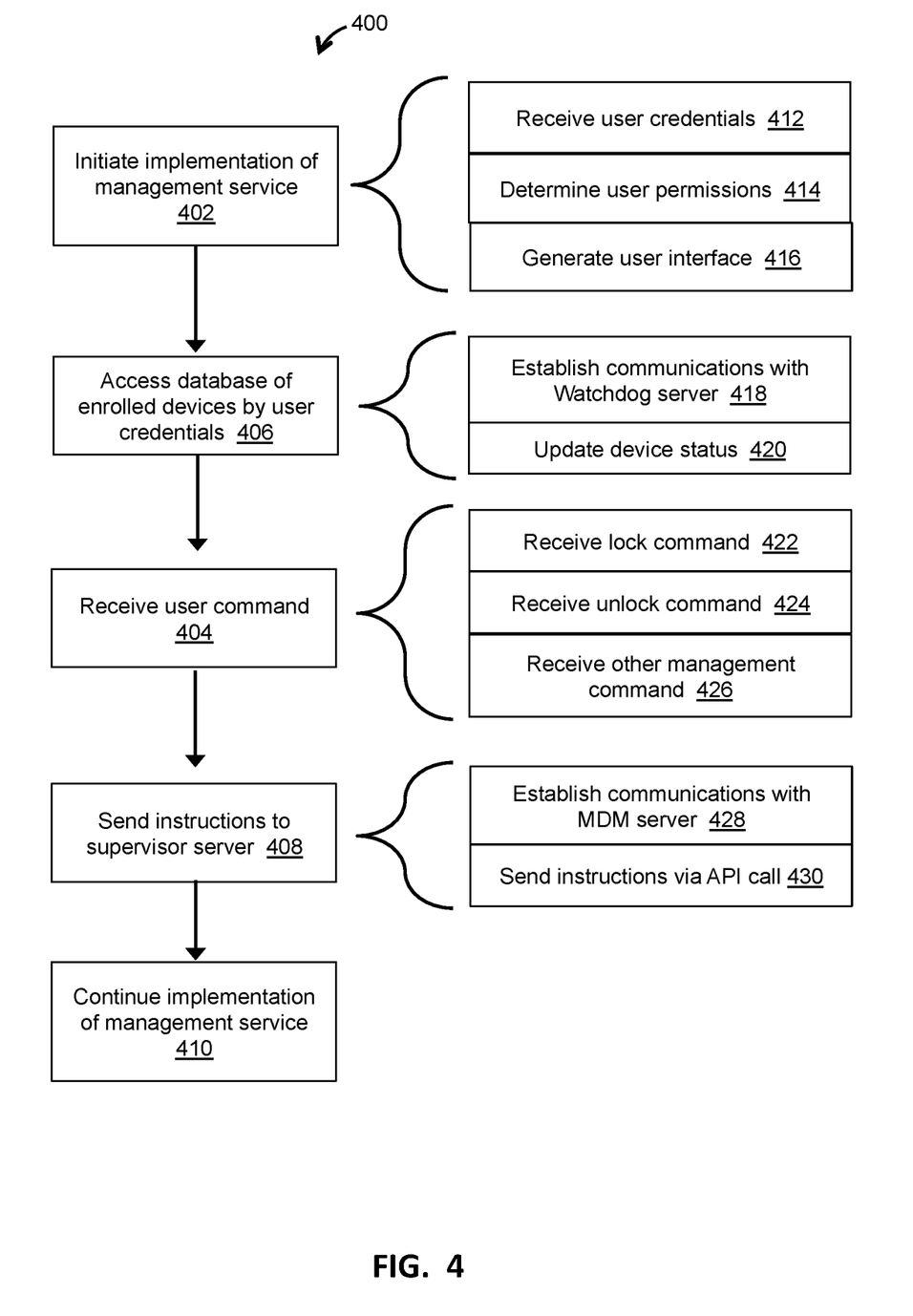
FIG. 4 is a flow diagram of a method of managing integrated security protection services for an electronic device on retail display in accordance with one example.

FIG. 4 is a flow diagram of a method 400 of managing security functionality for an electronic device on retail display. The method 400 is implemented by one or more of the above-described processors. For instance, the method 400 may be implemented by the processor 144 of the management computer 142 described above in connection with FIG. 1. The characteristics of the processor and the server computer may vary from the examples described above.

Several aspects of the method 400 are depicted in FIG. 4 as acts 400-430.

The above-described methods may include additional, fewer, or alternative acts.

Described above are devices and methods for providing security monitoring and benefit denial of electronic merchandise. In some aspects, the methods include or involve monitoring the electronic device for a trigger, and locking, upon detection of the trigger, the electronic device. In other aspects, the devices include a memory configured to store firmware instructions that, when executed, configure a processor of the electronic device to provide security monitoring and benefit denial. The processor may be configured to monitor, via the firmware instructions, the electronic device for a trigger, and lock, with the firmware upon detection of the trigger, the electronic device. Aspects of the method may be performed via a background application or other service running on the processor. Examples of triggers are disconnection from an external power source, loss of data integrity, movement of the device, and loss of communication. The methods and devices may provide the security monitoring in connection with a security system configured to generate an alarm upon detection of the trigger. Ins some cases, the alarm is generated prior to locking the device as a result of, for instance, an attempted theft of other merchandise on display.

The above-described devices and methods may be used or implemented to provide a software solution for instant theft deterrence for electronic products and devices. The disclosed devices and methods may provide for data analytics and alerts regarding the status of, and user interactions with, electronic products and devices. Aspects of the disclosed devices and methods may be implemented via, or otherwise involve, the firmware of the electronic device. Other aspects may be implemented via, or otherwise involve, a software application or other instructions running on the device. In some cases, a combination of firmware and application software may be used. For example, the software solution may be installed in the basic input/output system (BIOS) or other boot instructions (e.g., bootloader) or other firmware of a device in order to lock and unlock the device based on one or more triggers. The software solution may also be configured to provide local and remote status, alerts and other data regarding the device. Data analytics and alerts regarding the status of and user interactions with electronic products and devices may be provided.

By incorporating aspects of the software solution in the firmware or other persistent of the device, the software solution cannot be overcome by hard resetting the device (e.g., a hardware or factory reset). For example, during a hard reset, the core hardware components are reset to factory settings, deleting most software installed on the device. By installing the software solution in the firmware or persistent memory of the device, a hard reset of the device does not delete or otherwise remove the software solution. In some cases, a hard reset triggers a locking or benefit denial.

One or more aspects of the software solution may be installed as a software application (e.g., an app) on the device. Installation of a software application may be useful in connection with electronic devices for which the firmware is not capable of being customized. For example, a software application may be used in connection with electronic devices commercially available from Apple. In some cases, these aspects of the solution are implemented as a persistent application(s). For example, persistent applications reload or are reinstalled upon being closed or uninstalled. Additionally, in some cases, if the software application is uninstalled, the application will reinstall itself, such as using an internet, mobile or other network connection. Therefore, if a user deletes the software application, the application will be auto re-downloaded and installed on the device.

The disclosed methods and systems are well suited for implementation by, and use with, any electronic product capable of executing instructions, including any electronic devices having firmware or other persistent memory, such as laptops, computer, tablets, mobile phones, wearables, smart televisions and other computing-based consumer, commercial and/or industrial electronic products. The software solution may be implemented via any combination of firmware and software.

The disclosed devices and methods provide a software solution for immediate benefit denial of an electronic device. The benefit denial locks the device based on one or more triggers. By locking the device, the device is rendered unusable (e.g., bricked). If one or more of the triggers are no longer present, the benefit denial is removed and the device is unlocked. By using a software solution installed on the device, the security monitoring need not rely on an internet connection, key, user intervention or other connectivity to lock and unlock the device, although such elements may be optional in some cases.

The nature of the alarms or benefit denial may vary as described above. One or more alarms and/or benefit denials may be activated based on one or more triggers. Any trigger detectable by the software solution may be used.

The software solution may trigger the alarm and/or benefit denial based on losing connection to an external power source. For example, in a low security environment (e.g., a corporate or educational environment) where the device may not be physically secured to the location, the device may be plugged into external power. Therefore, unplugging the device from a power source may trigger an alarm or the benefit denial. Further, the software solution may only trigger an alarm and may not include benefit denial (e.g., in a low security environment).

The software solution may use loss of data integrity as a trigger. For example, using the external USB or other port on the device, the software solution may communicate with an external USB "dongle," such as a solid-state memory stick or other custom USB device attached to the device. Integrity of the USB port may be determined and used as a trigger. The software solution may monitor the USB data connection (e.g., data activity) and may trigger based on losing the connection. The software may also read and/or write a specific data "key" or other data to a USB solid state memory. Further, the software solution may read and validate periodic "pings" from the USB device.

The software solution may use specific motion as a trigger. For example, the device may include an accelerometer to detect movement of the device. Using information gathered from the device, the software solution may detect mechanical shock or other movements to be used as triggers. For example, a mechanical shock might indicate that the device is being forcibly removed from a display or other security product, or may have been dropped or damaged. Further, the software solution may detect that the device is being picked up and moved (e.g., a user walking or running with the device). The software solution may also trigger on being removed from a display or fixed location, such as if the device is removed from a location for longer than a threshold (e.g., long dwell times).

The software solution may also access a near field communication (NFC) or radio-frequency identification (RFID) reader on the device (e.g., in a mobile handset). The software solution may read and/or write to external NFC tags and/or other NFC-enabled devices monitor the device location, identification, etc. The software solution may also read and/or monitor connection with RFID-enabled tags and/or other device. For example, low-frequency (LF), high-frequency (HF), ultra-high-frequency (UHF), or other RFID technology may be used. The software solution may also access other functionality of the device (e.g., wi-fi, mobile, Bluetooth, etc.) to monitor the device and trigger the alarms and/or benefit denial. For example the software solution may be triggered if the device can no longer communicate with a networking device, such as a router, hub, main alarm, etc. In some cases, a Wi-Fi, Bluetooth, or other communication channel is configured to be invisible or inaccessible to unapproved users. For example, a communication channel used for triggering is not directly visible or accessible to the general public (e.g., users who are shopping for or using the products in the retail environment). By making the communication channel invisible inaccessible, the communication channel and/or the security solution is more difficult to disable and/or modify (e.g., settings, passwords, etc.). Further, use of the communication channel may be limited (e.g., preventing users from using the network and/or from incurring data charges).

The benefit denial may be removed manually and/or automatically. For example, in some cases, the device may be unlocked automatically if one or more of the triggers are no longer present. User intervention may also be used (e.g., needed) to unlock the device. In other cases, for example, if one or more of the triggers are no longer present, a PIN, key or other security information may be used (e.g., needed) to unlock the device. Other manual intervention may be used.

The disclosed devices and methods may also provide local and remote instant status, alerts and alarms. For example, instant visual and audible notifications and alarms may be displayed on the device display and through the device speaker(s). For example, device status may include a physical position, an "armed" setting, a device in motion alert, etc. Any status may be provided based on the capabilities of the device. E-mail and text notifications and other alerts may be provided based on the device status.

The disclosed devices and methods may also capture interactive data from the device. For example, the disclosed devices and methods may log user interactions and usage on the device, such as device lift and place events and dwell times. The disclosed devices and methods may also log electronic interactions with the device, such as communication events with other devices. The interactive data may be captured and stored as timestamps in a database. The disclosed devices and methods may be configured to provide analytics for the device based on the data. The data and/or analytics may be uploaded to a local or remote (e.g., cloud-based) server. The uploaded data may be used by the server or other device to provide analytics on the device.

The disclosed devices and methods may also provide for preventative maintenance and remote monitoring. For example, when a device is used by a large number of users, such as when displayed for sale or used in multi-user environment, the disclosed devices and methods may be used to perform maintenance and "housekeeping" for the device. Using the software solution, installed applications, pictures, browsing histories, etc. may be deleted from the device. The "housekeeping" may be performed manually or automatically, such as periodically (e.g., once per day or other periodic rate specified) to automatically search and clean the devices of unwanted clutter. The software solution may also factory reset the device remotely. Additionally, configuration of the firmware or software application may be performed remotely (e.g., "over-the-air" configurability from a remote connection).

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A method of establishing security monitoring functionality on a device on retail display, the method comprising:
    obtaining, by a processor of a server computer, a mobile device management (MDM) startup message from the device;
    determining, by the processor, whether the device is enrolled for MDM supervision; and
    when the device is enrolled for the MDM supervision, downloading, by the processor to the device, configuration data to support the MDM supervision and implementation of the security monitoring functionality;
    wherein the configuration data comprises instructions of a non-persistent security monitoring application on the device, the non-persistent securing monitoring application being configured to monitor the device for a security trigger event, and
    wherein persistence of the security monitoring functionality is established despite the non-persistent security monitoring application via operation of the device in a supervised mode in accordance with the MDM supervision.

2. The method of claim 1, wherein the configuration data comprises instructions of an MDM agent on the device, the MDM agent being configured to cause the device to enter into a locked state upon receipt of a command from the server computer.

3. The method of claim 1, wherein the non-persistent security monitoring application is further configured to communicate with a further server computer to indicate that the non-persistent security monitoring application is operational.

4. The method of claim 1, wherein the non-persistent security monitoring application is further configured to provide a single-application mode in which the device resides in response to an MDM command from the server computer to enter a locked state.

5. The method of claim 1, wherein the device is configured to enable remote supervision via data stored in persistent memory, the data leading to the device sending the MDM startup message.

6. The method of claim 5, wherein the data causes the device to contact an enrollment service, the enrollment service identifying the server computer as an MDM service for the device.

7. The method of claim 1, further comprising:
    determining, by the processor, whether the device has previously been provided with the MDM supervision by the server computer;
    when the device has not been previously provided with the MDM supervision, adding, by the processor, the device to an MDM service list of the server computer; and
    when the device has been previously provided with the MDM supervision, directing the device to enter into a locked mode after downloading the configuration data.

8. The method of claim 1, wherein obtaining the MDM startup message occurs while the device is implementing a boot sequence.

9. The method of claim 1, wherein obtaining the MDM startup message comprises receiving the MDM startup message from the device.

10. A method of establishing security monitoring functionality on a device on retail display, the method comprising:
    obtaining, by a processor of a server computer, a mobile device management (MDM) startup message from the device, the MDM startup message being sent by the device as a result of a boot sequence implemented by the device;

determining, by the processor, whether the device is enrolled for MDM supervision; and when the device is enrolled for the MDM supervision, downloading, by the processor to the device, configuration data to support the MDM supervision and implementation of the security monitoring functionality;

wherein the configuration data comprises instructions of a non-persistent security monitoring application on the device, the non-persistent securing monitoring application being configured to monitor the device for a security trigger event, and wherein persistence of the security monitoring functionality is established despite the non-persistent security monitoring application via operation of the device in a supervised mode in accordance with the MDM supervision.

11. The method of claim 10, wherein the configuration data comprises instructions of an MDM agent on the device, the MDM agent being configured to cause the device to enter into a locked state upon receipt of a command from the server computer.

12. The method of claim 10, wherein the non-persistent security monitoring application is further configured to communicate with a further server computer to indicate that the non-persistent security monitoring application is operational.

13. The method of claim 10, wherein the non-persistent security monitoring application is further configured to provide a single-application mode in which the device resides in response to an MDM command from the server computer to enter a locked state.

14. The method of claim 10, wherein the device is configured to enable remote supervision via data stored in persistent memory, the data leading to the device sending the MDM startup message.

15. The method of claim 14, wherein the data causes the device to contact an enrollment service, the enrollment service identifying the server computer as an MDM service for the device.

16. The method of claim 10, further comprising:
determining, by the processor, whether the device has previously been provided with the MDM supervision by the server computer;

when the device has not been previously provided with the MDM supervision, adding, by the processor, the device to an MDM service list of the server computer; and when the device has been previously provided with the MDM supervision, directing the device to enter into a locked mode after downloading the configuration data.

17. A system for establishing security monitoring functionality for a device on retail display, the system comprising:

a memory on which security provisioning instructions and mobile device management (MDM) instructions are stored; and a processor configured to execute the MDM instructions to implement a MDM service for the device;

wherein the processor is configured via execution of the security provisioning instructions to—obtain a mobile device management (MDM) startup message from the device;

determine whether the device is enrolled for MDM supervision; and when the device is enrolled for the MDM supervision, download configuration data to support the MDM supervision and implementation of the security monitoring functionality, wherein the configuration data comprises instructions of a non-persistent security monitoring application on the device, the non-persistent securing monitoring application being configured to monitor the device for a security trigger event, and wherein persistence of the security monitoring functionality is established despite the non-persistent security monitoring application via operation of the device in a supervised mode in accordance with the MDM supervision.

18. The system of claim 17, wherein:

the processor is configured via execution of the security provisioning instructions to determine whether the device has previously been provided with the MDM supervision; and the processor is configured via execution of the MDM instructions to direct the device to enter into a locked mode after the configuration data is downloaded when the device has been previously provided with the MDM supervision.

* * * * *